April 12, 1949. F. P. KERSCHBAUM ET AL 2,467,039
RECOVERY OF VANADIUM CONCENTRATE
Filed May 26, 1945
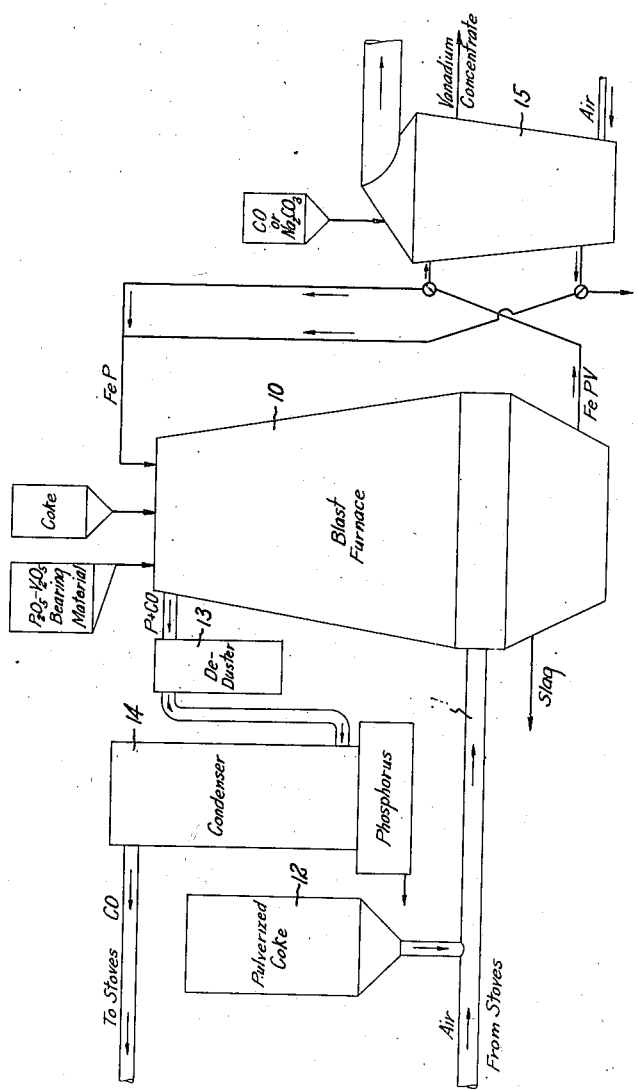
Inventors:
Friedrich P. Kerschbaum
Harold T. Stowell
By Harold T. Stowell
Attorney.

Patented Apr. 12, 1949

2,467,039

UNITED STATES PATENT OFFICE 2,467,039

RECOVERY OF VANADIUM CONCENTRATE

Friedrich P. Kerschbaum, Dayton, Ohio, and Harold T. Stowell, Washington, D. C.; said Kerschbaum assignor to said Stowell Application May 26, 1945, Serial No. 595,926

9 Claims. (Cl. 75—132)

The invention relates to a method of obtaining vanadium concentrates from vanadium-containing materials.

There are in the western part of the United States substantial deposits of vanadium-bearing phosphate ores containing 10% and over of $P_2O_5$ and of the order of 1% of $V_2O_5$. The relatively small proportion of vanadium in this material presents a difficult problem in the economical extraction and concentration of the vanadium. Similar vanadium-bearing phosphatic material is presented by the phosphate slags obtained in the treatment of vanadiferous iron ores, such as the Minette ores of western Europe, by the Thomas process.

The principal object of the invention is to provide an effective method of obtaining vanadium concentrates from vanadiferous materials.

A further object of the invention is to provide a method of obtaining phosphorus from vanadiferous phosphatic materials while obtaining the major portion of the vanadium content in the form of materials having a substantially greater vanadium content than the original material.

In general, the invention comprises smelting vanadiferous phosphatic materials under reducing conditions in the presence of iron or iron-bearing materials to obtain elemental phosphorus and a ferro-phosphorus product containing a substantial proportion of vanadium. By smelting vanadiferous phosphatic material with a carbonaceous reducing agent in the presence of iron-bearing material in a blast furnace or electric furnace, a major portion of the vanadium will be concentrated in the ferro-phosphorus produced concurrently with elemental phosphorus. Preferably, the reduction is carried out in a blast furnace in which the blast is maintained at a relatively high temperature and is maintained highly reducing by supplying a portion of the reducing agent with the blast, for example, in the form of coke breeze. The concentration of vanadium in the ferro-phosphorus may be increased by recirculating the ferro-phosphorus through the furnace as the phosphorus content of the ferro-phosphorus will not increase beyond its saturation point and may even be decreased by replacing phosphorus by vanadium under high temperature blast conditions in the presence of an excess of carbon.

If the coke used in the process contains vanadium, as is the case with coke made from certain western American coals or if a part of the fuel is supplied by vanadiferous oils, the vanadium content of the coke or oil will likewise be recovered in large part in the ferro-phosphorus.

The vanadium content of the vanadiferous ferro-phosphorus, either as directly produced in the furnace or after enrichment by recirculating through the furnace, may be advantageously obtained by blowing the ferro-phosphorus in molten condition in a Bessemer converter with air or oxygen-enriched air. Due to the higher heat of oxidation of vanadium than phosphorus, the vanadium can be substantially completely oxidized from the ferro-phosphorus while oxidizing only a relatively smaller proportion of the phosphorus.

If the blowing operation is carried out in the presence of an alkali metal or alkali earth metal slag-forming compound such as soda ash or lime, an alkali metal or alkaline earth metal phosphate-vanadate, which can readily be converted into useful vanadium compounds, may be obtained. If the blowing is effected in the absence of slag-forming agents, the vanadium oxide formed in the blowing together with some phosphorus oxide can be collected from the blast leaving the converter.

By way of illustration, a preferred embodiment of the invention will be described with reference to the accompanying drawing showing a diagrammatic flow sheet of a process embodying the principles of the invention.

The blast furnace 10 is supplied with a burden consisting of vanadium-bearing phosphatic material, such as the vanadiferous phosphate ores or the vanadiferous Thomas slags referred to above, coke, and sufficient iron-bearing material, which may consist in whole or in part of ferro-phosphorus from the oxidizing blast operation or of recirculated ferro-phosphorus, to provide when taking into account the iron content of the phosphatic charge, enough iron to absorb the vanadium content of the charge. In general, the iron content of the burden should be only a relatively small proportion of the amount of iron required to form ferro-phosphorus with the entire phosphorus content of the charge. The coke supplied to the furnace is about 50% of the weight of the phosphatic material. Slag-forming ingredients may be added to the burden if required, in accordance with known blast furnace practice.

A preheated air blast 11, which may advantageously be enriched with oxygen and which preferably contains a finely divided reducing agent, such as coke breeze from bin 12, is supplied to the blast furnace.

The vapor offtake, which consists of elemental phosphorus vapor carried in a gas mixture consisting essentially of carbon monoxide and residual nitrogen, is passed through a deduster 13 and a phosphorus condenser 14. The carbon monoxide-containing gas from the condenser is used for heating blast stoves and for other heating and power purposes.

The ferro-phosphorus produced in the furnace absorbs substantially all of the vanadium as it is formed by reduction from the vanadium compounds in the charge and flows to the bottom of the hearth. This vanadiferous ferro-phosphorus, preferably after being recirculated one or more times through the furnace to increase its vanadium content, is fed to the converter 15 where it is blown with air or oxygen-enriched air until the vanadium is completely oxidized, which point can be ascertained after experience with the process by a definite change in the characteristic color of the blast flame. The vanadium oxide content of the blast gases can be separated in a suitable separator. If a slag-forming material such as lime or soda ash is supplied to the converter, the vanadium-containing slag is drawn off as soon as the vanadium content of the charge is substantially completely oxidized.

The vanadium-stripped ferro-phosphorus is, in part, returned to the blast furnace operation and, in part, withdrawn for use or sale as such. The amount of vanadium-stripped ferro-phosphorus withdrawn from the process will be determined, in general, by the amount of iron supplied to the process in the burden materials.

It will be clear that the apparatus indicated in the flow sheet and referred to in the foregoing description is merely illustrative and that the principles of the invention may be embodied in a variety of method and apparatus arrangements within the scope of the claims. It is possible by the method of the invention to obtain, from vanadiferous phosphatic material containing from 10 to 100 times as much phosphorus as vanadium, vanadium concentrates containing as much vanadium as phosphorus or even a greater proportion of vanadium.

We claim:

1. A method of obtaining vanadium concentrates from vanadiferous phosphatic materials which comprises smelting vanadiferous phosphatic material with a carbonaceous reducing agent in the presence of iron in an amount sufficient to form ferro-phosphorus with only a minor portion of the phosphorus content of the material.

2. A method of obtaining vanadium concentrates from vanadiferous phosphatic materials which comprises smelting vanadiferous phosphatic material with a carbonaceous reducing agent in the presence of iron in an amount sufficient to form ferro-phosphorus with only a portion of the phosphorus content of the material and returning the vanadiferous ferro-phosphorus thereby formed to the smelting operation.

3. A method of obtaining vanadium concentrates from vanadiferous phosphatic materials which comprises smelting vanadiferous phosphatic material with a carbonaceous reducing agent in the presence of iron in an amount sufficient to form ferro-phosphorus with only a portion of the phosphorus content of the material and blowing the vanadiferous ferro-phosphorus therby formed in molten condition with oxygen-containing gas until the vanadium content is substantially completely oxidized.

4. A method of obtaining vanadium concentrates from vanadiferous phosphatic materials which comprises smelting vanadiferous phosphatic material with a carbonaceous reducing agent in the presence of iron in an amount sufficient to form ferro-phosphorus with only a portion of the phosphorus content of the material and blowing the vanadiferous ferro-phosphorus thereby formed in molten condition with oxygen-containing gas in the presence of an alkali-forming compound until the vanadium content is substantially completely oxidized.

5. A method of obtaining vanadium concentrates from vanadiferous phosphatic materials which comprises smelting vanadiferous phosphatic materials with a carbonaceous reducing agent in the presence of iron in an amount sufficient to form ferro-phosphorus with only a portion of the phosphorus content of the material and blowing the vanadiferous ferro-phosphorus thereby formed in molten condition with oxygen-containing gas in the presence of lime until the vanadium content is substantially completely oxidized.

6. A method of obtaining vanadium concentrates from vanadiferous phosphatic materials which comprises smelting vanadiferous phosphatic material with a carbonaceous reducing agent in the presence of iron in an amount sufficient to form ferro-phosphorus with only a portion of the phosphorus content of the material, returning the vanadiferous ferro-phosphorus thereby formed to the smelting operation, and thereafter blowing the vanadiferous ferro-phosphorus in molten condition with oxygen-containing gas until the vanadium content is substantially completely oxidized.

7. A method of obtaining vanadium concentrates from vanadiferous phosphatic materials which comprises smelting vanadiferous phosphatic material in a blast furnace with a carbonaceous reducing agent in the presence of iron in an amount sufficient to form ferro-phosphorus with only a minor portion of the phosphorus content of the material.

8. A method of obtaining vanadium concentrates from vanadiferous phosphatic materials which comprises smelting vanadiferous phosphatic material in a blast furnace with coke in the presence of iron in an amount sufficient to form ferro-phosphorus with only a portion of the phosphorus content of the material, a portion of the coke being supplied to the smelting operation in suspension in an oxygen-containing blast.

9. A method of obtaining vanadium concentrates from vanadiferous phosphatic materials which comprises smelting vanadiferous phosphatic material with a carbonaceous reducing agent in the presence of iron in an amount sufficient to form ferro-phosphorus with only a portion of the phosphorus content of the material, blowing the vanadiferous ferro-phosphorus thereby formed in molten condition with oxygen-containing gas until the vanadium content is substantially completely oxidized, and returning at least a portion of the vanadium-stripped ferro-phosphorus to the smelting operation.

FRIEDRICH P. KERSCHBAUM.
HAROLD T. STOWELL.

REFERENCES CITED

The following references are of record in the file of this patent:

UNITED STATES PATENTS

| Number | Name | Date |
|---|---|---|
| 282,118 | Reese | July 31, 1883 |
| 1,534,819 | Von Seth | Apr. 21, 1925 |
| 2,087,719 | Grobstein | July 20, 1937 |